Patented June 7, 1932

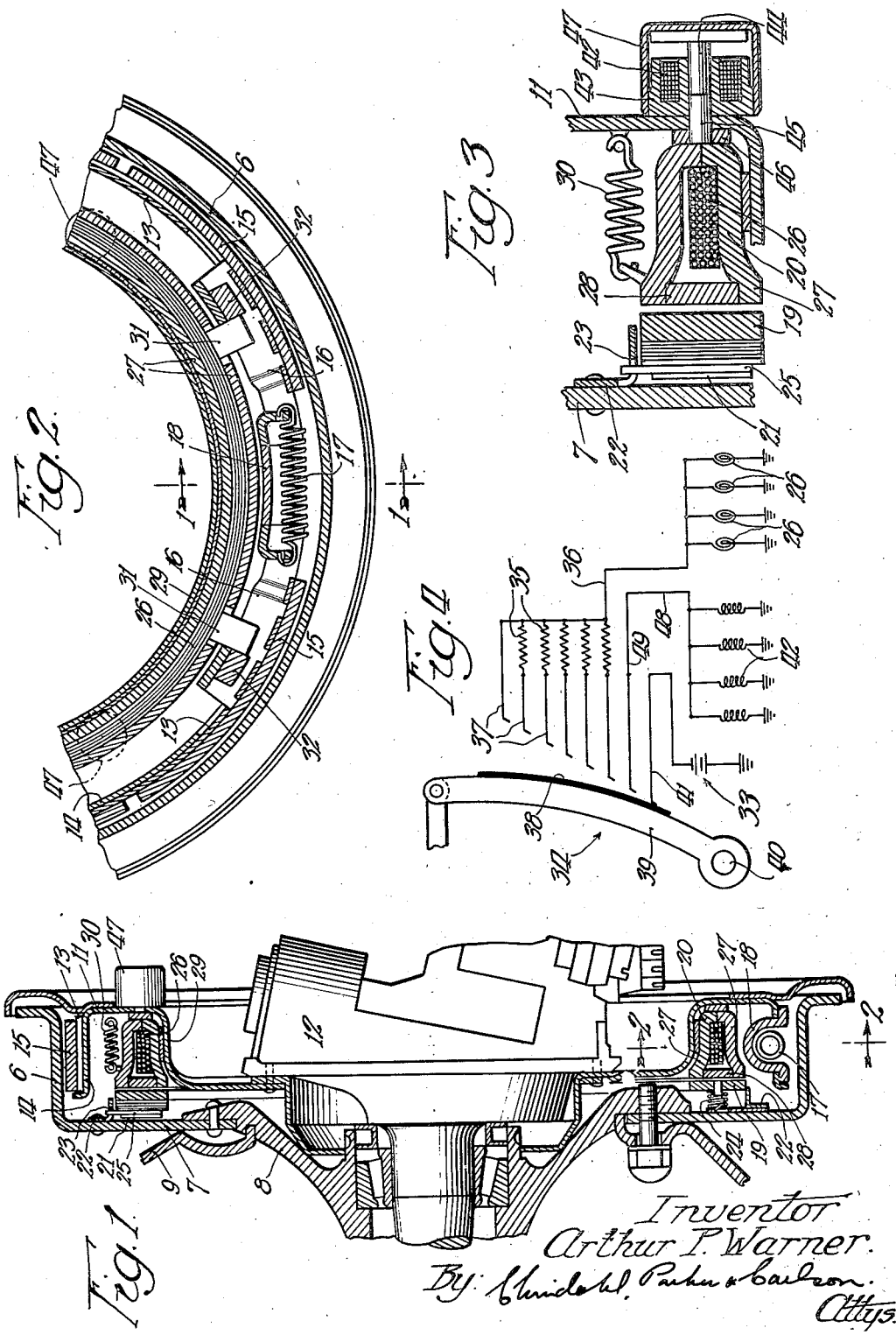

1,861,729

UNITED STATES PATENT OFFICE

ARTHUR P. WARNER, OF BELOIT, WISCONSIN, ASSIGNOR TO WARNER ELECTRIC BRAKE CORPORATION, OF SOUTH BELOIT, ILLINOIS, A CORPORATION OF ILLINOIS

ELECTRIC FRICTION BRAKE

Application filed February 17, 1930. Serial No. 428,904.

The invention relates to electric brakes and more particularly to brakes adapted for use on automotive vehicles.

The coacting magnetic elements employed in brakes of the above class are usually in the form of two rings of magnetic material, one mounted to rotate with the vehicle wheel to which the brake is applied. The armature ring usually has a flat surface and completes the magnetic flux circuit across two concentric poles of the other element which carries the energizing winding. The efficiency of magnets of this character are extremely powerful in their action when there is practically no air gap between the coacting portions of the magnet and its armature. But in the environment above described, the inherent lateral wobbling of the vehicle wheel, due to the allowable looseness of the parts and other causes, tends to produce an air gap of such relatively large width as to render a brake of the above character practically uncontrollable. That is to say, a current applied to the brake magnet of an intensity sufficient to overcome the gap between the magnetic elements will, when the elements are brought into mechanical contact and the gap thereby eliminated, produce a severe and excessive braking action. Thus, it is impossible to obtain the sensitive control and graduated application of the brake which is required in order to render such a brake suitable for use on modern automotive vehicles.

It is the object of the present invention to overcome the objection above mentioned through the provision of a novel supplemental means which acts independently of the main brake magnet to urge the normally separated magnetic elements into mechanical contact and thereby effectually overcome any air gap between the elements.

Another object is to place the supplemental means above referred to under the control of the same means that controls the energization of the brake so that any air gap between the magnetic elements will be overcome automatically.

Other objects and advantages of the invention will become apparent from the following detailed description taken in connection with the accompanying drawing, in which Figure 1 is a fragmentary view in vertical section of a vehicle wheel equipped with a brake embodying the features of the present invention, the section being taken substantially along the line 1—1 of Fig. 2.

Fig. 2 is a fragmentary sectional view taken along the line 2—2 of Fig. 1.

Fig. 3 is an enlarged view of the upper portion of Fig. 1.

Fig. 4 is a wiring diagram of the brake control circuits.

While the invention is susceptible of various modifications and alternative constructions, I have shown in the drawing and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the exemplary form shown in the drawing, the invention is embodied in an electric brake including a rotatable drum 6 having the usual flange 7 bolted or otherwise secured to the inner end of a hub 8 of a vehicle wheel 9. The inwardly opening end of the drum is closed by an annular plate 11 suitably secured to a steering knuckle 12 or other relatively non-rotatable part.

In the present instance, the non-rotatable friction surface of the brake is of the band type comprising a metal strip 13 encircling an inwardly projecting flange 14 on the anchor plate and carrying segments 15 of friction material. Fittings 16 are secured to the opposite ends of the strip 13 and drawn by a spring 17 into abutting engagement with the opposite end surfaces of a stop 18 rigid with the anchor plate.

The operator for spreading the ends of the band apart, thereby setting the brake, comprises two rings 19 and 20 of magnetic material arranged concentric with the drum and adapted for axial gripping engagement. The ring 19, which constitutes the magnetic armature, is of rectangular cross-sectional shape and relatively narrow axial width. Preferably this ring is of solid metal construction and floatingly supported from the drum so as to rotate therewith, at the same time being adapted for some degree of axial movement. To this end the back of the ring is secured at annularly spaced points to the ends of flexible metal strips 21 which extend in a direction substantially tangent to the ring 19, and are rigid at their other ends with a ring 22 in turn riveted to the drum flange 7. When the wheel and drum with the armature unit mounted thereon are placed on the axle, the inwardly facing friction face of the armature is urged away from the drum flange 7 by springs 24 acting in compression between the rings 19 and 22. This inward axial movement of the armature is limited by engagement of arms 25 on the armature and stop surfaces 23 on the ring 22. The strips 21, it will be observed, act in tension to prevent relative rotation between the rings 19 and 22 in one direction. Relative rotation in the other direction is prevented by engagement between the ring 22 and the arms 25.

The ring 22 constitutes the magnet proper and is U-shaped in cross-section with a winding 26 disposed between its two concentric poles 27, which are separated by plates 28 of non-magnetic material providing a wear resisting surface substantially flush with the end faces of the poles and adapted to sustain the axial pressure between the two magnetic rings. The magnet is supported by a circular flange portion 29 of the anchor plate for oscillation about the drum axis and for axial movement toward and away from the face of the armature ring. Normally, that is when the magnet is deenergized, the magnet is drawn away from the armature by springs 30 acting in tension between the magnet and the anchor plate. Thus the faces of the magnet and armature are separated by an air gap of such width that the faces do not come into mechanical contact due to the lateral wobbling of the armature in the rotation of the vehicle wheel.

Projecting rigidly from the outer magnet pole are two actuating lugs 31 having oppositely facing surfaces positioned to abut against lugs 32 which are rigid with the fittings 16. Upon movement of the magnet in either direction away from normal brake-released position (Fig. 2), one or the other of the lugs 31 will move its end of the brake away from the stop 18, thereby expanding the band and pressing its entire friction surface against the drum. The lugs 31, it will be observed, do not hinder the axial movement of the magnet ring.

The magnet windings 26 for the different brakes of the vehicle are arranged to be energized from the storage battery 33 by manipulation of a rheostat 34 (Fig. 4) by the vehicle driver. The rheostat shown herein diagrammatically comprises a plurality of resistance elements 35 connected to a common conductor 36 which leads to one terminal end of each winding 26. The other ends of the winding are grounded to the vehicle frame. At their other ends the resistance elements 35 are connected to resilient metal strips 37 whose ends are arranged to be engaged successively by a contact plate 38 on a lever 39 pivoted at 40 and adapted to be moved into abutment with the strips 37 by actuation of a foot pedal or other controller (not shown) within the reach of the vehicle driver.

The non-grounded terminal of the storage battery 33 is connected to a strip 41 of the rheostat which is normally engaged by the contact plate 38 when the controller is in inactive position. Thus, when the controller pedal is depressed sufficiently to bring the contact plate against the first resistance strip 37, the circuit through the windings 26 will be completed. Further movement of the controller will increase the intensity of the current by cutting in additional resistance elements successively.

The current which is caused to flow through the windings 26 upon the initial closure of the circuits by the rheostat 34 is of such a small magnitude as to be incapable of overcoming the air gap normally interrupting the magnetic flux circuit through the magnet and armature rings. Means is therefore provided which acts independently of the brake magnet to bring the two rings into mechanical contact substantially coincident with the application of current to the winding 26. This means comprises a supplemental magnet whose action is not materially affected by variations in the position of its armature relative to the magnet core. The supplemental magnets herein employed are of the solenoid type, each comprising a tubular coil 42 (Fig. 3) mounted in a core 43 which is located externally of the anchor plate 11 substantially opposite the magnet ring 20. The armature of each solenoid is in the form of a T-shaped plunger 44, whose shank is slidable endwise in a central aperture of the core 43 and is adapted to apply an actuating force to the magnet ring 20 through the medium of a rod 45 which projects through the anchor plate and a backing pad 46 and bears against the back of the magnet ring. Thus, when the solenoid is energized, the magnet ring is moved against the action of the springs 30 toward the armature ring and therefore brought into mechanical contact with the friction surface of the latter, thereby closing the air gap between the rings with a resultant reduction in the reluctance in the magnetic circuit through the rings.

Each solenoid and its armature may be suitably enclosed in a cup-shaped casing 47 secured to the outer side of the anchor plate.

The casing acts to limit the return movement of the plunger 44. A plurality of these auxiliary solenoids may be employed, if desired, being spaced uniformly around the anchor plate as shown in Fig. 2.

In order that the magnetic circuit through the rings of each brake will be closed substantially simultaneously with the initial application of energizing current to the winding 26, the energization of the solenoids is controlled by the same means that governs the current application to and regulates the current flow in the main winding. This means comprises the foot pedal controller of the rheostat and in order that the current for the solenoids may be of different intensity than that in the winding 26, it is preferred to interpose the solenoid coils 42 in circuits independent of the main windings 26. For this purpose one terminal of each coil 42 is grounded to the vehicle frame and the other is connected by an insulated cable conductor 48 to a metal strip 49 incorporated in the rheostat so that its free end will be engaged by the contact plate 38 prior to or substantially simultaneously with the engagement of the first resistant strip 37. Thus, the strips 41 and 49 and the contact plate form a switch which is closed to complete the energizing circuit for the solenoids as an incident to the application of current to the main brake windings.

The brake above described operates in the following manner when the vehicle driver depresses the foot pedal controller. Upon engagement of the contact plate 38 with the strip 49, all of the solenoid coils 42 will be energized causing their plungers 44 to move inwardly and force the magnet against the action of the springs 30 into mechanical contact with the face of the armature ring 19, thereby closing the magnetic circuit through the two rings. No appreciable gripping action takes place at this time between the magnet and armature rings owing to the fact that the armature is yieldable in an axial direction.

Engagement between the contactor and the first resistance strip 37 applies current to the winding 26 causing gripping engagement between the friction surfaces of the two rings proportional to the strength of the energizing current, whereupon the magnet ring will be driven frictionally by the armature ring, thereby moving with the wheel a short angular distance. In this movement one end of the band is moved away from the stop 18 which expands the band, thereby pressing the segments 15 against the drum surface. After the normal clearance has been taken up angular movement of the magnet ceases, causing slippage between the ring surfaces in the continued rotation of the wheel. Further movement of the rheostat controller increases the gripping action between the rings 19 and 20 and therefore varies the retarding action applied to the vehicle wheels.

When the rheostat controller is returned to normal position (Fig. 4), the current flow through the windings 26 and the solenoid coils 42 is interrupted, whereupon the spring 17 then acts through the medium of the fitting 16 and the lug 31 to restore the magnet as well as the actuated end of the band to normal position. At the same time, the rings 19 and 20 become separated under the action of the springs 30.

No claim is made herein to the manner of mounting the magnet and armature, the manner of transmitting the movement of the magnet to the friction band, the construction of the anchor plate, and of the control rheostat, such features forming the subject matter of my co-pending application Serial No. 428,905, filed February 17, 1930, and of John Whyte, Serial No. 280,173, filed May 24, 1928, Serial No. 320,129, filed November 17, 1928, Serial No. 417,385, filed December 30, 1929, and Serial No. 428,870, filed February 17, 1930, and a copending application of Swan Leveen, Serial No. 393,380, filed September 18, 1929.

I claim as my invention:

1. In an electric vehicle brake, the combination of a drum rotatable with a wheel of the vehicle, a non-rotatable plate closing the open end of said drum, a pair of annular magnetic rings arranged for axial gripping engagement to determine the degree of braking action applied to said wheel, one of said elements being rotatable with said drum, the other being mounted on said plate for floating axial movement relative to said plate, a magnet winding carried by one of said elements and adapted when energized to produce gripping engagement between the coacting surfaces of the elements, spring means acting on said last mentioned element and normally holding the same out of mechanical contact with said other element, a solenoid magnet mounted exteriorly of said plate and having an armature plunger movable in a direction parallel to the drum axis, said plunger, upon energization of said solenoid, being projected against said last mentioned magnetic element and acting to move the same into mechanical contact with the rotatable element, and manually operable means for applying energizing current to said winding and said solenoid.

2. An electric friction brake having, in combination, a magnetic element having an annular friction surface which rotates during motion of the part whose motion is to be controlled, a second magnetic element having a friction surface adapted for gripping engagement with said first mentioned surface, one of said elements having concentric poles facing the other element, a winding mounted between said poles and adapted when energized to create a magnetic flux in the magnetic circuit through said poles and the opposing element thereby causing gripping engagement of said friction surfaces, yieldable means normally acting to hold said friction surfaces out of contact while said winding is deenergized, manually controllable means for applying an energizing current of variable intensity to said winding, and means supplemental to said winding and acting automatically as an incident to the operation of said manually controllable means to overcome the action of said yieldable means and thereby bring said surfaces into mechanical contact independently of said winding.

3. In an electric friction brake for a vehicle, a pair of rings of magnetic material having opposed annular faces, one of said rings being rotatable during motion of the vehicle, a winding carried by one of said rings and adapted when energized to create a magnetic flux which threads the ferromagnetic circuit through the faces of said rings thereby causing frictional gripping engagement the magnitude of which determines the degree of braking action, control means governing the closure of an energizing circuit through said winding, the faces of said rings being maintained out of mechanical contact while said winding is deenergized, a supplemental electromagnet adapted when energized to urge said rings into mechanical contact, and a single manually operable controller for governing the energization of said winding and said electromagnet.

4. In an electrically controlled friction brake, the combination of two annular magnetic elements having friction faces arranged for axial gripping engagement, one of said elements being rotatable with the part to be braked, a magnetic winding carried by one of said elements and adapted to control the degree of gripping engagement between the elements, means normally acting to maintain said faces out of frictional contact, a supplemental electromagnet adapted when energized to apply an actuating force to one of said elements in a direction to bring the friction faces into mechanical contact, and a single manually operable controller by which said winding and said electromagnet may be energized and the intensity of the energizing current in said winding varied to produce varying degrees of braking.

5. In an electrically controlled friction brake, the combination of two annular magnetic elements having friction faces arranged for axial gripping engagement, one of said elements being rotatable with the part to be braked, a magnetic winding carried by one of said elements and adapted to control the degree of gripping engagement between the elements, means normally acting to maintain said faces out of frictional contact, a supplemental electromagnet adapted when energized to apply an actuating force to one of said elements in a direction to bring the friction faces into mechanical contact, a rheostat controlling the application of current to and the intensity of the current flowing in said winding, a switch controlling the application of current to said electromagnet, and a common actuating means for said switch and rheostat operable to apply current to said winding and electromagnet substantially simultaneously and in continued movement to increase the intensity of the current energizing said winding.

6. In an electrically controlled friction brake, the combination of two annular magnetic elements having friction faces arranged for axial gripping engagement, one of said elements being rotatable with the part to be braked, a magnetic winding carried by one of said elements and adapted to control the degree of gripping engagement between the elements, means normally acting to maintain said faces out of frictional contact, a solenoid magnet having an armature operatively associated with one of said elements and adapted when energized to apply a force to one side of the element in a direction to move that element into mechanical contact with the other element, and manually controllable means for governing the application of energizing current to said winding and solenoid.

7. In an electrically controlled friction brake, the combination of two annular magnetic elements having friction faces arranged for axial gripping engagement, one of said elements being rotatable with the part to be braked, a magnetic winding carried by one of said elements and adapted to control the degree of gripping engagement between the elements, said elements being normally maintained out of mechanical contact with each other, means for applying energizing current to and controllably varying the current in said winding to effect varying degrees of braking action, and means acting substantially coincident with the application of current to said winding to establish mechanical contact between said elements independently of the attractive force produced by said winding.

8. In an electrically controlled friction brake, the combination of two annular magnetic elements having friction faces arranged for axial gripping engagement, one of said elements being rotatable with the part to be braked, a magnetic winding carried by one of said elements and adapted to control the degree of gripping engagement between the elements, spring means normally acting to separate said elements and maintain their friction faces out of mechanical contact, an electromagnet of the solenoid type having an armature plunger operatively associated with one of said elements and movable, upon energization of the solenoid, in a direction to bring said friction faces into mechanical contact against the action of said spring means, and means operable automatically in the application of energizing current to said winding to apply energizing current to said solenoid.

9. In a braking system for an automotive vehicle, the combination of a brake having two annular magnetic elements arranged for axial gripping engagement and normally maintained out of mechanical contact, a magnetic winding adapted to be variably energized to control the degree of gripping engagement between said elements and therefore the braking action on the vehicle, and means controllable by the vehicle driver and operable to produce mechanical contact between said elements substantially coincident with the application of current to said winding so that the latter need not overcome the air gap normally maintained between said elements.

10. In a braking system for an automotive vehicle, the combination of a brake having two annular magnetic elements arranged for axial gripping engagement and normally maintained out of mechanical contact, a magnetic winding adapted to be variably energized to control the degree of gripping engagement between said elements and therefore the braking action on the vehicle, a device controllable by the vehicle driver and operable upon movement in one direction to apply an energizing current to said winding and then to increase said current progressively, and means supplemental to said winding rendered active by operation of said device and operable to produce mechanical contact between said elements substantially simultaneously with the initial current application to said winding.

In testimony whereof, I have hereunto affixed my signature.

ARTHUR P. WARNER.